United States Patent [19]

Bicknell

[11] Patent Number: 4,745,475
[45] Date of Patent: May 17, 1988

[54] DISPLAYS FOR INFORMATION OBTAINED BY VECTOR SCANNING

[75] Inventor: John Bicknell, Rudgwick, England

[73] Assignee: Mars Incorporated, McLean, Va.

[21] Appl. No.: 807,349

[22] Filed: Dec. 10, 1985

[30] Foreign Application Priority Data

Dec. 11, 1984 [GB] United Kingdom ................. 8431208

[51] Int. Cl.$^4$ .............................................. H04N 7/01
[52] U.S. Cl. ................................... 358/140; 342/185; 364/731; 340/720
[58] Field of Search ......................... 358/140; 342/185; 364/731; 340/728, 720

[56] References Cited

U.S. PATENT DOCUMENTS

| | | | |
|---|---|---|---|
| 4,002,827 | 1/1977 | Nevin et al. | 358/140 |
| 4,065,770 | 12/1977 | Berry | 358/140 |
| 4,149,252 | 4/1979 | Miller, Jr. | 364/731 |
| 4,214,269 | 7/1980 | Parker et al. | 358/140 |
| 4,220,969 | 9/1980 | Nitadori | 342/185 |
| 4,275,415 | 6/1981 | Engle | 358/140 |
| 4,568,941 | 2/1986 | Thomas et al. | 342/185 |
| 4,618,887 | 10/1986 | Birk | 358/140 |
| 4,660,043 | 4/1987 | Lachaize et al. | 358/140 |

FOREIGN PATENT DOCUMENTS 0068852 5/1983 European Pat. Off. .

Primary Examiner—James J. Groody
Assistant Examiner—John K. Peng
Attorney, Agent, or Firm—Curtis, Morris & Safford

[57] ABSTRACT

A system for converting A-scan signals in r, $\theta$ co-ordinates into display data for x, y co-ordinate display locations, in which, for each A-scan signal, signal values for which the r co-ordinate is greater than a predetermined value contribute to the display data and values for which the r co-ordinate is less do not, and the predetermined values of r are different for different A-scans. FIG. 2 shows pixels, or display locations, close to the origin of an x, y rastor display. The lines radiating from the origin show the r, $\theta$ co-ordinates of A-scan signals derived from a radar antenna, superposed for purposes of illustration on the grid of pixels. The display data used to brighten an individual pixel is taken only from some, and not from all, of the A-scans which intercept that pixel. In particular, no data is taken from the portions of the A-scans which lie radially inwardly of the points 28 to 36, but data is taken from the portions of the A-scans that lie radially outwardly.

29 Claims, 2 Drawing Sheets

DISPLAYS FOR INFORMATION OBTAINED BY VECTOR SCANNING

This invention relates to displays for information obtained by vector scanning, such as radar and sonar displays. In discussing the invention only radar will be specifically referred to but in general it will be appreciated that the invention can be supplied wherever there is a need to convert received vector scan signals, which are in r, θ co-ordinates, into data which is available in x, y co-ordinates so that a display may be formed on a display device which is operated in an x, y format, such as a raster display cathode ray tube.

It is standard practice to transmit radar pulses from, and receive their echoes at, an antenna which rotates typically at approximately one rotation per second. During one rotation, in the region of 4,000 pulses may be transmitted at equal intervals and for each pulse a plurality of echoes may be received depending upon what objects are in the path of the transmitted pulse. The set of echoes returned from a single transmitted pulse are converted into an analog electrical signal which for the purposes of this specification will be called an A-scan and is well known as such. A complete set of A-scans corresponding to one complete rotation of the antenna (i.e. typically about 4,000 A-scans) are known and will be referred to as a B-scan.

The signals of a B-scan are in an r, θ co-ordinate system which has the antenna as its origin. For the purpose of displaying the radar picture it has been standard practice to use a cathode ray tube (CRT) which is operated in a corresponding r, θ co-ordinate format. For each A-scan the CRT beam starts at the screen centre and moves radially to its periphery, being modulated by the analog A-scan signal as it does so. Each radial sweep is angularly displaced a little relative to the preceding one by an amount equal to the angular displacement of the antenna between successive A-scans, this being achieved in known manner by providing the display with a signal derived from or related to the system which rotates the antenna, this signal whatever its form being in effect a signal indicating current value of the θ co-ordinate. The CRT screen is provided with a phosphor which has a degree of persistence so that a complete picture resulting from all the A-scans contained is built up on the screen and continually refreshed by the rotating beam.

The r co-ordinate of the display is the radial distance of a particular point on the screen from the beam sweep origin and it corresponds, but of course on a very small scale, to the r co-ordinate of a point within the view of the antenna and along a corresponding θ co-ordinate to that of the particular point on the screen. The current position of the beam on the CRT screen in the r direction is determined in known manner by timing circuitry which causes the beam to sweep outwardly from the screen centre at a predetermined speed starting from the origin at the moment when a radar pulse is transmitted. An echo pulse from an object or target will be received after a time interval proportionate to its distance from the antenna and so it will be displayed at a proportionate distance from the origin on the face of the CRT, due to the constant speed of the CRT beam sweep. In that context, the r co-ordinate signal is a ramp signal starting from zero at the moment a radar pulse is transmitted but it will be evident that in principle any signal indicative of time elapsed since transmission of a radar pulse represents the current r co-ordinate value.

There are benefits to be had by displaying the picture on a raster display CRT in which the beam makes successive horizontal sweeps across the screen starting from the top and finishing at the bottom, typically 625 times to fill the screen, in the manner of the normal British television standard.

This, whilst in principle relatively simple, in practice involves very considerable problems if the cost of the required circuitry is to be kept low. The present invention is concerned with achieving such a display format at low cost so that it can be made available to, for example, the owners of small boats for whom it is not practical to purchase expensive equipment.

Consider the information that has to be displayed in two horizontal raster lines, one of which lies just a little above the centre point of the screen and the other of which lies just a little below that point. Referring to r, θ co-ordinates, it is convenient to suppose that the origin for θ i.e. the line representing θ=0, is a line running from the centre point of the screen horizontally leftwards, i.e. between the two raster lines just referred to. In that situation, the left-hand portion of the upper raster line must contain information derived from the first, or in any event a very early, radial A-scan whereas the lower raster line will contain in its left-hand portion information derived from the last, or in any event a very late, A-scan. The separation in time between those two A-scans will be of the order of 1 second whereas of course the two raster lines must both be displayed within a very small fraction of a second in order to achieve continuity of the picture. Consequently, it is necessary to store information derived from a large number of A-scans in order to have available all the information needed to form the picture from horizontal raster lines. It is appropriate to notionally divide the screen up into an array of rows and columns of picture elements, referred to as pixels. A respective electronic storage element, such as one specific storage location in a random access memory (RAM) should then be available to store a signal indicative of desired image brightness in each particular pixel. The more pixels there are, the more storage is required, and hence the greater is the cost incurred in providing it and so it is desirable to make the pixel size as large as possible consistent with acceptable image definition to keep the cost of the memory or storage down. A display having 512×256 pixels is in all probability acceptable.

To illustrate a problem which arises from the significant area of the pixels, it is convenient now to refer to FIG. 2 of the accompanying drawings.

The problem arises in principle irrespective of storage requirements and is a consequence of the display being in effect a matrix display, having rows and columns of pixels of finite size, whether these be defined by the structure of a display device itself or by its manner of operation e.g. a raster scan CRT driven from a memory with discrete data value locations.

FIG. 2 shows a group of 4×4 pixels located in the central region of the screen, the exact centre of the screen being located at 0 in the bottom right-hand corner. The screen periphery will lie many tens of pixels to the left of the figure, and many tens of pixels beyond the top of the figure, and of course the complete screen will contain four quadrants of pixels. However, the problem can be explained with reference to the small number shown. The radial lines labelled A1 to A9 are the innermost portions of the first nine A-scans starting from $\theta = 0$. They are not of course displayed on the screen in the manner illustrated, but they are shown superimposed on the screen pixels purely for convenience of illustration, the scale of the figure for similar reasons being arbitrary. In practice, if there were 4,000 A-scans per B-scan, there would be 1,000 A-scans in the particular screen quadrant of which part is shown. All 1,000 of them would therefore intersect the pixel a1, 500 would intersect the pixels a2 and b1, and so on with the number of scans per pixel decreasing towards the periphery of the screen down to an average of between 2 and 3 for the extreme peripheral pixels.

The invention seeks to achieve acceptably uniform and good picture characteristics over the whole picture area despite the extreme variation of information available, per pixel, between the centre and the periphery.

In one aspect, the invention provides a system for converting A-scan signals in r, $\theta$ co-ordinates into display data for x, y co-ordinate display locations, in which, for each A-scan signal, signal values for which the r co-ordinate is greater than a predetermined value contribute to the display data and values for which the r co-ordinate is less do not, and the predetermined values of r are different for different A-scans.

The above provides a technique by which the display data, i.e. the data from which a display arrangement is actually to be driven, is rendered more uniform in density as between the display periphery and its centre.

There may be derived (for example by sampling) from an A-scan signal in r, $\theta$ co-ordinates a succession of signal values. Those values or functions of them are stored at respective memory or storage locations which are identifiable by means of x, y co-ordinates corresponding to the r, $\theta$ co-ordinates of each sample; however, not all samples are stored, or used to alter the data contained at a storage location. Rather, and especially for the pixels near the screen centre, a substantial proportion of the signal values relating to a particular pixel and derived during one B-scan are ignored and only the remainder are allowed to contribute to the x, y co-ordinate data stored for that pixel. A particular way of achieving this is disclosed below in which none of the succession of signal values derived from a particular A-scan are permitted to contribute to the data in a pixel memory location until a particular value of co-ordinate r (or it may be regarded as a combination of co-ordinates x, y) is reached but thereafter the signal values are allowed to contribute to pixel memory locations, the change-over point being different for different A-scans.

The display data may comprise a respective data value for each display location and each data value may include contributions from a plurality of A-scan signal values whose r, $\theta$ co-ordinates are closely similar and whose x, y co-ordinates are the same.

In accordance with a feature of the invention, the predetermined values of r are selected such that during an individual B-scan the number of A-scan signal values contributing to each data value is limited to a predetermined maximum.

The predetermined maximum may be made less than or equal to the number of the plurality of A-scan signal values that contribute to a data value in which case the effect of combining several contributions is to improve the signal to noise ratio of the data value within each B-scan as compared with the signal to noise ratio in the individual A-scans.

However, in the embodiment of the invention which will be described in detail, the plurality of A-scan signal values is greater in number than said predetermined maximum, whereby the data values include contributions from more than one B-scan. In this way, two desirable characteristics are achieved. In addition to an improvement in signal to noise ratio within an individual B-scan, the signal to noise ratio in relation to noise having a frequency approximating to that of the B-scans (such as may arise from waves on the sea) is also improved. Furthermore, a degree of persistence is provided whereby a moving target is displayed with a fainter tail adjacent to it indicative of its direction and speed of movement, as will be more fully described. The degree of persistence can be controlled by determining the relationship between the number of A-scans allowed to contribute to the data value within an individual B-scan, and the total number of A-scans allowed to contribute to a data value.

Further, if the number of A-scans from within an individual B-scan which are allowed to contribute to the data value is made not substantially more than the minimum number of A-scans available per pixel (this minimum number occurring at the picture periphery), then the effect on the signal to noise ratio of the scan converter and the degree of persistence will be substantially uniform across the picture area.

From another aspect, the invention provides a system for displaying on a matrix-type display information obtained from the A-scan signals of a vector scanning arrangement, in which the display over at least the major part of its area shows information, which has been electronically stored, from the corresponding A-scans of more than one B-scan whereby to provide persistence in the display.

The invention will be better understood from the following description of an embodiment thereof, which is by way of example only, with reference to the accompanying drawings, in which:

FIG. 1 shows some of a typical set of A-scans indicated at A1, A2 or An, each A-scan consisting of an analog waveform extending from time $t_1$ to time $t_2$. A large plurality, perhaps thousands, of such A-scans constitute a single B-scan as indicated in the Figure and as previously explained.

Figure 3:
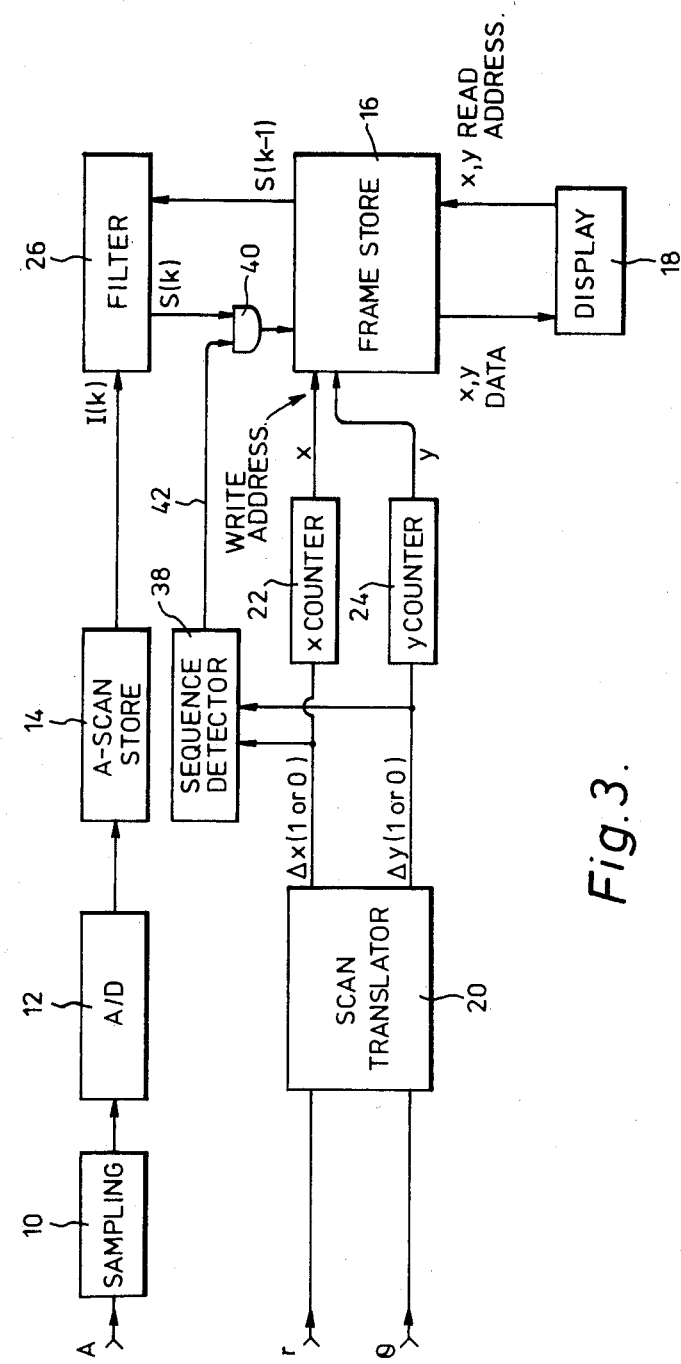
FIG. 3 shows diagrammatically one form in which the invention can be implemented.

The A-scan signals are applied one at a time, as they are generated, to the terminal A of the system in FIG. 3. The terminals r and $\theta$ receive the appropriate r, $\theta$ co-ordinate signals for each A-scan. During interval $t_1$ to $t_2$ the A-scan signal is repetitively sampled at high speed by a sampling circuit 10 to produce analog samples whose values represent the amplitude of the A-scan signal at a succession of r co-ordinates. The $\theta$ co-ordinate of an individual A-scan signal is of course constant. The analog samples are passed to an analog-to-digital converter 12 which converts them into 4-bit digital form in which they are transferred to an A-scan store which may be a RAM having sufficient capacity to contain all the digitized samples arising from a single A-scan. During the interval $t_2$ to $t_3$ when no A-scan input information is being received, the remainder of the system processes digital A-scan values from A-scan store 14 and stores them in a frame store 16 at appropriate addresses which are identifiable by means of x, y co-ordinates. This will be described in more detail below.

Continuously, and without any particular timed relationship to the other events, a raster-type CRT display unit 18 sends read address signals in x, y co-ordinates to the frame store 16 in a sequence matching that required for the raster display format, receives from the frame store the stored data values in the requested sequence, and uses them to modulate its scanning beam thereby presenting a raster display of the targets within the field and range of the radar equipment.

The process of writing information from the A-scan store 14 into the frame store 16 will now be described.

Figure 1:
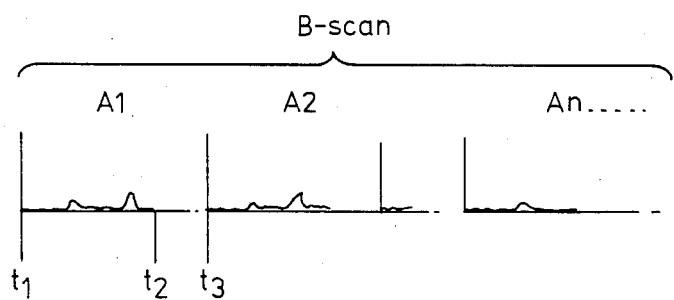
FIG. 1 shows some A-scan waveforms.
Figure 2:
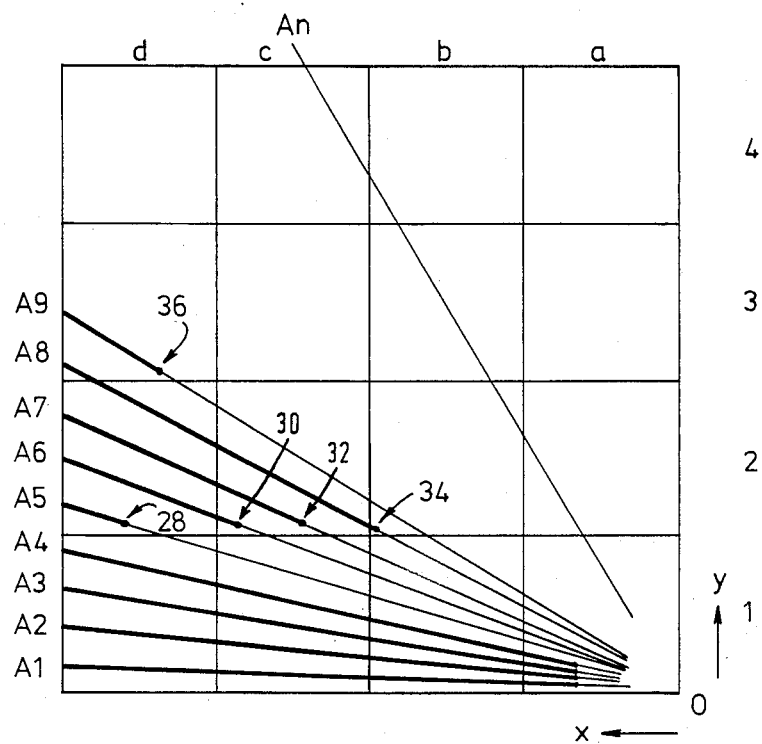
FIG. 2 shows a small group of pixels of a raster display with A-scans superimposed, as has already been discussed in some detail.

In order to write the digitized A-scan values from A-scan store 14 into frame store 16, the appropriate x, y addresses in the frame store 16 have to be addressed in correct sequence, and the addresses are generated from the r, $\theta$ co-ordinate signals by means of a scan translator 20 and x and y counters 22 and 24. The scan translator 20 contains a look-up table which, in response to a given value of $\theta$ and a changing value of r (i.e. throughout a given A-scan) it uses to generate x and y address increment signals. These signals are shown on FIG. 3 as $\Delta x$ and $\Delta y$ and for each new pixel, or frame store address, $\Delta x$ or $\Delta y$ is either 1 or 0. Referring to FIG. 2, and to the line representing A-scan An, it can be seen that the $\Delta x$ and $\Delta y$ increments required during the initial part of A-scan An, starting from pixel a1, are 01 (i.e. x increment 0, y increment 1), 10, 01, 01, 10. This sequence will address in order the pixels or addresses (FIG. 2 can serve as an illustration of either) identified as a1, a2, b2, b3, b4 and c4 in that order, which is appropriate for A-scan An. The x and y increment signals are applied to the respective x and y counters 22 and 24 which accumulate them as x and y write address signals which are used to address the frame store 16 in, for example, the specific sequence just described for A-scan An. Such address signal sequences start from the beginning of A1 and continue until the end of the final A-scan of a B-scan, then repeat.

As will be readily appreciated by those skilled in the art, standard timing circuitry (not shown) will be employed to ensure that when counters 22, 24 are generating the x, y address of a particular pixel, the digitized sample for that same pixel is delivered from the output of A-scan store 14.

A-scan store 14 delivers its digitized samples in succession as inputs I to a recursive filter 26. Suppose the next such input is the kth input which is destined for a specific x, y address. That address will already, owing to previous operation of the system, contain a data value $S(k-1)$ which was the last output from filter 26 to be delivered to that address. When that address is addressed the kth time, frame store 16 sends the present data value $S(k-1)$ to recursive filter 26 which is receiving the new input I(k). The recursive filter 26 generates a new output data value S(k) in accordance with the following function:

$$S(k) = S(-1) + 1/k_1(I(k) - S(k-1)).$$

In this function, $k_1$ is a filter factor which can be set to any suitable value.

The effect of this function (other functions might be employed to achieve a similar result) is that the value of S(k) is dependent not merely on the most recent input I, but on the values of several successive recent inputs I, the actual number depending upon the chosen value of the filter factor $k_1$ and the output resolution of frame store 16 (this may for example be four bits). In general, the greater the value of $k_i$ the greater is the averaging effect and consequently the greater is the improvement in signal to noise ratio. For that reason it is in principle desirable to make $k_1$ reasonable large. Suppose it is chosen such that the frame store data value includes contributions only from approximately the last 16 A-scans. As has already been mentioned, pixels close to the centre of the screen may be accessed hundreds, or even thousands, of times in succession by successive A-scans in a single B-scan, the worst case being the pixel a1 of FIG. 2. This would result in very rapid saturation of the filter for these pixels i.e. S(k) would have a value determined only by a small fraction of the available A-scans in a B-scan, and there would be no B-scan to B-scan averaging to reduce low frequency noise. On the other hand, peripheral pixels may be accessed only three times per B-scan so there would be averaging over five B-scans. The resulting variations in picture characteristics between the centre and periphery are undesirable.

An aspect of the present invention involves a technique by which this can be avoided. Suppose, for example, that it is decided to limit to four the number of times an individual pixel can be addressed during a single B-scan. In an aspect of the invention, this is achieved by not permitting the values I derived from an individual A-scan to access a pixel until a special value of r is reached within that A-scan. Thereafter, the successive values of I for that A-scan are permitted to contribute to the value of S(k) written into the appropriate pixel storage locations of the frame store. The particular values of r employed as these start points for writing into the frame store are derived as illustrated in FIG. 2. Referring to that figure, for each of A-scans A1 to A4 it is satisfactory for each one of pixels a1, b1, c1 and d1 to be accessed because this will not result in any of those pixels (nor any pixels further to their left) being accessed more than four times. However, when A-scan A5 is to processed, it is not written in to any of pixels a1 to d1 because they have already had the maximum number of four contributions during this particular B-scan. Signal values from A-scan A5 are therefore not written into pixels unti the start point indicated at 28 is reached but that point and for increasing values of r beyond that point all signal values I are written into the frame store 16 after processing by the recursive filter 26. A-scans A6 to A8 are treated similarly and the start points for them to access pixels are indicated at 30, 32 and 34. When A-scan A9 arrives, it is not written into the frame store through the recursive filter until start point 36 is reached, so as to avoid making a fifth contribution to pixel d2 of the frame store. To aid interpretation of FIG. 2, the portions of an A-scan which are written into the frame store are indicated by heavier lines than those portions which are not written into the frame store. It will be appreciated that the process just outlined can be continued for all the A-scans of the quadrant illustrated in FIG. 2 to develop a complete set of start points such as 28 to 36 for all of the A-scans in that quadrant. The start points for the other quadrants can be equivalent to those for the first.

In order to put this pattern of writing into the frame store into effect, the look-up table contained in scan translator 20 is modified to include a special characteristic, and a sequence detector 38 is employed to detect this special characteristic and use it to enable or disable an AND gate 40 which controls the writing of new data values S(k) into the frame store 16.

A particular form of such a system will be described by first referring to how the scan translator is arranged to deal with A-scan A9. The normal initial sequence of increment pairs for this A-scan, starting from pixel a1, would be 10, 01, 10, 10, 01, thus arriving at pixel d3. However, since this A-scan is not to be written into the frame store for the first three pixels which it traverses, the $\Delta x$ and $\Delta y$ values generated by the scan translator during that part of the A-scan are unimportant so far as the writing process itself is concerned. Instead of generating the above $\Delta x$, $\Delta y$ increments which would normally be expected, the scan translator look-up table is arranged to generate first *all but one* of the 01 increments needed to arrive at d3 (i.e. a single 01), then *all* the 10 increments needed (i.e. three of them), then the previously omitted 01 increment. In this way, the final sequence of increment pairs is made to be 10, 01. The particular sequence 10, 01 is the special characteristic which the sequence detector 38 is arranged to detect. In response, the sequence detector enables gate 40 via line 42. Consequently, the next value of S(k) from recursive filter 26 will be written through gate 40 into the frame store. It will be appreciated that this data value is the one corresponding to I for the start point 36 of A-scan A9 in pixel d3 of FIG. 2. Thus, contributions from A-scan A9 start being contributed to the data values inserted into frame store 16 from the correct point. Following recognition of the special sequence by sequence detector 38, gate 40 continues to be enabled until the particular A-scan is completed, so that each pixel or memory location beyond start point 36 receives a contribution from A-scan A9.

In the example just given, the normal sequence of increment pairs for the A-scan did not include any 11 pairs. However, the normal sequence sometimes will. In general, to achieve the final 10, 01 pairs to initiate writing, the look-up table in scan translator 20 can be organised so that to reach every start point pixel all the 11 increments are generated first, all but one of the 01 increments next, than all of the 10 increments, and finally the omitted 01 increment, whereby the special sequence 10, 01 is always generated in order to bring the frame store writing process into operation at the correct pixel.

It should be appreciated that other patterns of writing start points than that illustrated by FIG. 2 can be devised which will also have the effect of limiting the number of pixel accesses, and the same technique of initiating writing at the correct point can be applied to them.

The above explanation relates to operation in the top left quadrant. The same look-up table is used for operation in each of the other three quadrants because the pattern of writing into them will be identical to that in the first. However the addresses of pixels in the other three quadrants which are equivalent to a pixel at address $x_1$, $y_1$, in the top left quadrant will be $-x_1$, $y_1$, $-y_1$ and $x_1$, $-y_1$, (in clockwise sequence of quadrants). Well known techniques can be used to cause the x and-/or y address signals (as appropriate in a given quadrant) to increment in the negative direction, in response to identification of the current quadrant from the value of the $\theta$ signal.

Using the above techniques, the frame store 16 will contain a data value for every x, y address. In order to display the radar picture in raster format, the display unit 18 is provided, using conventional techniques and components, with means for generating x, y read address signals which are appropriately related to its x and y beam deflection signals, these read address signals being used to address the frame store 16 which delivers the appropriate data values to the display, these then being converted in conventional manner to analog signals which in turn are used to modulate the beam intensity.

The above explanation deals with the processing, storage and display of the signals generated during a single B-scan. In operation, B-scan signals are received in succession at approximately one B-scan per second. At the beginning of a B-scan, the frame store 16 will already contain data values which have been previously generated. The effect of the recursive filter 26, operating in accordance with the transfer function set out by the equation already given, is that the data value for each pixel contains a contribution from each of a limited number of the most recent A-scan samples belonging to that pixel. The actual number is defined by the value chosen for the filter constant $k_1$, and the output resolution of the frame store 16. If it is made equal to or less than the maximum number of data write operations into the frame store per pixel as already described with reference to FIG. 2, then the data value for a given pixel after each B-scan will be a function only of the A-scan samples for that pixel during that same B-scan. Information from preceding B-scans will have dropped out of the output of the recursive filter. In the particular embodiment described, since the maximum number of permitted write operations into the frame store per B-scan is four, the conditions just described are obtained by making the filter factor $k_1$ such that the filter remembers or integrates only over the most recent four or less A-scan samples. Then, the display 18 will show only the information derived from the most recent B-scan, since that is all the frame store 16 contains.

However, if the filter factor $k_1$ is chosen so that the number of A-scan samples contributing to a data value in frame store 16 is greater than the maximum number of write operations into a given frame store address per B-scan, then a data value in the frame store 16 will contain information not only from the most recent B-scan, but also from the previous one, and possibly also from one or more further preceding B-scans, the actual number of B-scans involved depending upon the exact value of $k_1$ chosen.

This enables a selectable degree of persistence to be achieved in the picture on the display unit 18, the effect being that a moving target shown on the display 18 will appear at full brightness in its current position, and at progressively decreasing brightnesses in the positions it occuppied during a succession of most recent B-scans. For example, a point target which has moved upwards within column b of FIG. 2 may appear at full brightness in pixel b4, half brightness in pixel b3, quarter brightness in pixel b2, and zero brightness (i.e. absent) in pixel b1. In this way, targets moving relative to the antenna are given, on the display, a "tail" the direction of which indicates their direction of relative movement and the length of which indicates their speed of relative movement, both of these factors being of great value to the user of the radar equipment in interpreting the pictue provided on the display.

It is to be noted that the signal to noise ratio for relatively high frequencies can be increased by increasing the maximum number of times an individual frame store memory location can be written during a B-scan, because this in effect permits averaging over a larger number of A-scan samples. On the other hand, for a given value of filter factor $k_1$, the improvement of signal to noise ratio will be at the expense of some or all of the persistence from B-scan to B-scan and at the expense of lower frequency signal to noise ratio. Further, the improvement can only be obtained for pixels where extra A-scan samples are available for use, which may not be the case at and near to the periphery of the screen where there are far fewer A-scans per pixel than near the screen centre. Reduced persistence might be compensated for near the screen centre by increasing the filter factor but in the peripheral areas, in addition to the signal to noise ratio not being improved, the increased filter factor will generate additional and perhaps excessive persistence. It will be apparent that the number of pixels on the screen, the filter factor, the desired degree of persistence, and the achievable signal to noise ratio are all linked and in a practical design compromises must be made depending upon which performance and cost factors are most important in a particular application.

It should be understood that the A-scan signals upon which the invention operates, operates to produce x, y co-ordinate signal values may be original A-scan signals as delivered directly from radar echo receiving circuitry or may be processed versions of such original signals, for example signals in which signal-to-noise ratio has been improved by processing together a plurality of adjacent original A-scan signals to provide a pre-processed A-scan signal to which the invention is then applied. The term "A-scan signal" is thus not limited to the original signals from a radar receiver, where used in the following claims.

I claim:

1. A method for converting A-scan signal information in r, θ coordinates into display data for x, y co-ordinate display locations, comprising the steps of contributing the signal information in each A-scan signal to the display data only when the r co-ordinates of said A-scan signal is greater than a predetermined value, and establishing different predetermined values of r for different A-scans.

2. A method as claimed in claim 1, in which the display data comprises a respective data value for each display location and further comprising the step of contributing to each data value from a plurality of A-scan signal values whose r, θ co-ordinates are closely similar and whose x, y co-ordinates are the same.

3. A method as claimed in claim 2, further comprising the step of selecting predetermined values of r such that during an individual B-scan the number of A-scan signal values contributing to each data value is limited to a predetermined maximum.

4. A method as claimed in claim 3, further comprising the of step of selecting a number of A-scan signal values for contributing to each data value, the selected number being greater than said predetermined maximum, whereby at least some of the data values include contributions from more than one B-scan.

5. A method as claimed in claim 4, further comprising the step of creating a data value which is a function of its own previous value and the value of the next A-scan signal value to contribute to it, wherein the function is such as to give the most recent contributing A-scan signal greater weight and the less recent contributing A-scan signals lesser weight.

6. A method as claimed in claim 5, further comprising the step of producing display data values in digital form, the number of digits in said digital form being limited, whereby the number of said plurality of A-scan signal values that contribute to a data value is limited.

7. A method as claimed in claim 5, wherein said function is represented as:

$$S(k)=S(k-1)+1/k_1(I(k)-(S(k-1))$$

where
$S(k-1)$ is the previous data value
$S(k)$ is the newest data value
$I(k)$ is the newest A-scan signal value
$k_1$ as a constant.

8. A method as claimed in claim 7, further comprising the step of delivering to a display means, operable in a raster scan format, the display data for the x, y coordinate display locations of the display means in a sequence compatible with the raster scan.

9. A method as claimed in claim 2, further comprising the step of sensing those r, θ coordinates which correspond to the respective predetermined r values for the different A-scans, and starting the contribution of A-scan values to the data values in response to such sensing.

10. A method as claimed in claim 9, further comprising the step of producing a starting signal in response to those sensed r, θ coordinates.

11. A method as claimed in claim 2, further comprising the step of storing the data values in respective addressable storage locations, generating x, y address signals, changing the x, y address signals during an A-scan signal by converting r, θ coordinate signals to x increment and y increment signals and adding the increment signals to the x, y address signals, said value of r for each A-scan being established in the form of a predetermined sequence of increment x and increment y signals which occur when the x, y address signals reach values corresponding to said value of r for that A-scan, detecting the occurrence of the predetermined sequence, and starting the contribution of A-scan values to the data values in response to its detection.

12. A method as claimed in claim 11, in which the predetermined sequence is preceded by increment x and increment y signals which do not result in x, y address signals corresponding to the r, θ coordinates for the A-scan, but is followed by increment x and increment y signals which do.

13. A method of converting data present in a plurality of A-scan signals obtained from a vector scanning arrangement for the eventual display on a matrix type display comprising the steps of:
converting the r, θ coordinate data into x, y coordinate data,
quantising the signal data corresponding to the converted r, θ coordinate data, and
selectively manipulating and storing the quantised signal data according to its corresponding x, y coordinate for eventual display if, and only if, the number of previous manipulations for the x, y coordinate is less than a number required to give a representation of the signal data.

14. A system for converting A-scan signal information in r, θ coordinates into display data for x, y coordinate display locations comprising means for contributing the signal information in each A-scan signal to the display data only when the r coordinate of said A-scan signal is greater than a predetermined value, and means for establishing different predetermined values of r for different A-scans.

15. A system as claimed in claim 14 in which the display data comprises a respective data value for each display location and further comprising means for contributing to each data value from a plurality of A-scan signal values whose r, $\theta$ coordinates are closely similar and whose x, y coordinates are the same.

16. A system as claimed in claim 15 further comprising means for selecting predetermined values of r such that during an individual B-scan the number of A-scan signal values contributing to each data value is limited to a predetermined maximum.

17. A system is claimed in claim 16, further comprising means for using a number of A-scan signal values for contributing to each data value, said number being greater than said predetermined maximum, whereby at least some of the data values include contributions from more than one B-scan.

18. A system as claimed in claim 17 further comprising means for creating a data value which is a function of its own previous value and the value of the next A-scan signal value to contribute to it, wherein the function is such as to give the most recent contributing A-scan signal greater weight and the less recent contributing A-scan signals lesser weight.

19. A system as claimed in claim 18 further comprising means for producing display data values in digital form, the number of digits in said digital form being limited, whereby the number of said plurality of A-scan signal values that contribute to a data value is limited.

20. A system as claimed in claim 19 wherein said function is represented as:

$$S(k) = S(k-1) + 1/k_1(I(k) - (S(k-1))$$

where
$S(k-1)$ is the previous data value
$S(k)$ is the newest data value
$I(k)$ is the newest A-scan signal value
$k_1$ as a constant.

21. A system as claimed in claim 20 further comprising means for delivering to a display means, operable in a raster scan format, the display data for the x, y coordinate display locations of the display means in a sequence appropriately compatible with the raster scan.

22. A system as is claim 15, further comprising means for recognizing those r, $\theta$ coordinates which correspond to the respective predetermined r values for the different A-scans, and means for starting the contribution of A-scan values to the data values in response to said recognition.

23. A system, as claimed in claim 22, wherein said means for recognizing comprises a look-up table for producing a starting signal in response to r, $\theta$ coordinates being inputted.

24. A system as claimed in claim 15, further comprising storage means for storing data values in respective addressable storage locations which are addressed by x, y address signals, means for changing said x, y address signals during an A-scan signal by adding thereto increment x and increment y signals, an r to x, y scan converter for producing said increment x and increment y signals, means for setting the predetermined value of r for each A-scan into the scan converter in the form of a predetermined sequence of increment x and increment y signals which occur when the x, y address signals reach values corresponding to said value of r for that A-scan, means for detecting the occurrence of the predetermined sequence, and means for starting the contribution of A-scan values to the data values in response to said detection.

25. A system as claimed in claim 24, wherein the predetermined sequence is preceded by increment x and increment y signals which do not result in x, y address signals corresponding to the r, $\theta$ co-ordinates for the A-scan, but is followed by increment x and increment y signals which do.

26. A system for displaying on a matrix-type display, data obtained from A-scan signals of a vector scanning arrangement, comprising means for displaying data, means for deriving the data to be displayed from the A-scans of more than one B-scan, and means for storing the data to be displayed by said means for displaying data such as to provide persistence in the display.

27. A system for converting A-scan signals in r, $\theta$ coordinates into display data for x, y coordinate display locations, comprising means for generating a plurality of A-scan signals whose $\theta$ coordinates are so closely similar that each of the A-scan signals in said plurality includes an A-scan signal value having the same x, y coordinate display location, and means operable to generate the display data for said x, y coordinate display location from only a limited plurality of said A-scan signal values which have the same x, y coordinate display location.

28. A system as claimed in claim 27, further comprising means for including in said limited plurality signal values from A-scans which are in different B-scans.

29. A system for converting data present in a plurality of A-scan signals obtained from a vector scanning arrangement for eventual display on a matrix type display comprising:
means for converting the r, $\theta$ coordinate data into x, y coordinate data,
means for quantising the signal data corresponding to the converted r, $\theta$ coordinate data, and
means for selectively manipulating and storing the quantised signal data according to its corresponding x, y coordinate for eventual display if, and only if, the number of previous manipulations for the x, y coordinate is less than a number required to give a representation of the signal data.

* * * * *